United States Patent [19]

Eyb

[11] Patent Number: 4,664,436
[45] Date of Patent: May 12, 1987

[54] LOCKING DEVICE FOR AN AUTOMOBILE TOP

[75] Inventor: Wolfgang Eyb, Leonberg, Fed. Rep. of Germany

[73] Assignee: Dr. Ing. H.c.F. Porsche Aktiengesellschaft, Fed. Rep. of Germany

[21] Appl. No.: 721,771

[22] Filed: Apr. 10, 1985

[30] Foreign Application Priority Data

Apr. 10, 1984 [DE] Fed. Rep. of Germany ....... 3413379

[51] Int. Cl.$^4$ .......................... B60J 7/185; E05C 3/14
[52] U.S. Cl. .................................... 296/121; 296/224; 292/67; 292/DIG. 5
[58] Field of Search ................... 292/66, 67, 272–274, 292/204, DIG. 5; 296/121, 218, 224, 120 R, 120 A

[56] References Cited

U.S. PATENT DOCUMENTS

| | | | |
|---|---|---|---|
| 2,305,715 | 12/1942 | Keller | 296/120 A |
| 2,411,945 | 12/1946 | Vigmostao | 296/120 A |
| 2,709,621 | 5/1955 | Votypka | 292/DIG. 5 |
| 2,831,718 | 4/1958 | Haller et al. | 292/DIG. 5 |
| 2,852,292 | 9/1958 | Galla | 292/DIG. 5 |
| 3,079,196 | 2/1963 | Golde | 296/224 |
| 3,089,719 | 5/1963 | Csizmansky | 292/DIG. 5 |
| 3,353,864 | 11/1967 | Antaya et al. | 296/121 |
| 3,476,437 | 11/1969 | Schroeder et al. | 296/218 |
| 3,584,912 | 6/1971 | Leger | 296/121 |
| 4,101,161 | 7/1978 | Currall | 296/224 |
| 4,249,770 | 2/1981 | Hunt | 296/218 |
| 4,435,007 | 3/1984 | Bascou | 292/272 |

FOREIGN PATENT DOCUMENTS

| | | | |
|---|---|---|---|
| 899000 | 12/1953 | Fed. Rep. of Germany | 296/120 A |
| 1167194 | 4/1964 | Fed. Rep. of Germany | 296/224 |
| 1925227 | 1/1970 | Fed. Rep. of Germany | . |
| 2239301 | 2/1974 | Fed. Rep. of Germany | 296/224 |
| 1162627 | 8/1969 | United Kingdom | 296/218 |

Primary Examiner—Robert B. Reeves
Assistant Examiner—Dennis H. Pedder
Attorney, Agent, or Firm—Barnes & Thornburg

[57] ABSTRACT

A device is provided for locking the top of a motor vehicle to the windshield frame of the vehicle. The device comprises a locking member arranged at a forward frame section of the top, a mounting provided at the windshield frame, as well as centering members effective between the top and the windshield frame.

The locking member comprises a crank connected with an operating unit, this crank being equipped with a locking pin. The locking pin cooperates with a slotted guide track constituting the mounting, in such a manner that the movement of the locking pin within the track of the slotted guide track means results in a reciprocating motion of the frame section of the top. The device is capable of being advantageously employed in a convertible top vehicle.

23 Claims, 12 Drawing Figures

LOCKING DEVICE FOR AN AUTOMOBILE TOP

BACKGROUND AND SUMMARY OF THE INVENTION

The invention relates generally to locking devices for vehicle tops and more particularly to a locking device for locking the top to the windshield frame of the vehicle wherein the locking device comprises a locking member arranged at a forward frame section of the top, a mounting provided at the windshield frame, as well as a centering means effective between the top and the windshield frame.

In a known locking mechanism of the general type described above disclosed in German Patent No. 1,915,227, a hook is provided on the underside of the windshield frame. This hook cooperates with a clamping bracket supported on the side of the top and the clamping bracket is attached to a lever that passes through dead center. Furthermore, a centering device is arranged between the windshield frame and the top which fixes the top in the transverse and vertical directions before the top is braced against the windshield frame by means of the clamping bracket and the lever, respectively.

This arrangement has the drawback that the components forming the locking mechanism are located, without a cover, in the region where a driver's and/or passenger's head can impact, thereby increasing the risk of injuries in the occurrence of a vehicle collision. Since the locking device can be operated only manually, and several manipulations are required for the locking and unlocking steps (i.e. suspending and detaching the clamping bracket and tensioning and releasing of the clamping bracket by means of the lever), the operating convenience of this locking mechanism is substantially impaired. Furthermore, considerable force must be expended for locking the top in place since the top is braced, by means of the lever and/or clamping bracket, downwardly and/or forwardly against the windshield frame. During the pivoting of the lever, there is always a danger of pinching the installer's fingers. Moreover, the structure of this locking device requires a large amount of installation space at the windshield frame and at the top, respectively, which makes it difficult to provide unrestricted design possibilities in this region.

It is one object of this invention to provide a locking device between a windshield frame and a forward frame section of the top which affords satisfactory operating convenience.

It is another object of the present invention to provide a locking device exhibiting favorable space-occupying conditions.

An even further object of the present invention is to satisfy the ever-increasing requirements for motor vehicle occupant safety in the passenger compartment.

These and other objects of the present invention are attained by the provision of a locking device for locking the top of the motor vehicle to the windshield frame of the vehicle wherein the locking device comprises a locking member arranged at a forward frame section at the top, a mounting provided at the windshield frame, and centering means effective between the top and windshield frame. The locking member comprises a crank, equipped with a locking pin and connected with an operating unit. The locking pin cooperates with a slotted guide means constituting the mounting in such a manner that the movement of the locking pin within the guide track of the slotted guide means results in a vertical reciprocating motion of the frame section of the top. The device may advantageously be employed for example, in vehicles exhibiting convertible tops.

Other objects, advantages and novel features of the present invention will become apparent from the following detailed description of the invention, when considered in conjunction with the accompanying drawings.

DETAILED DESCRIPTION OF THE DRAWINGS

Figure 1:
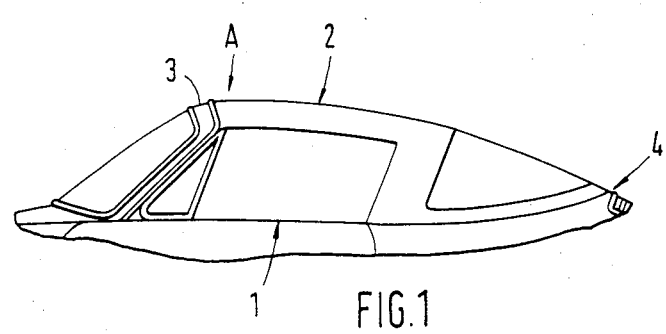
FIG. 1 is a partial lateral view of a passenger car with a convertible top.

The portion of a passenger car illustrated in FIG. 1 exhibits a convertible top 2 above its girth line 1, which extends, in its closed position A, between windshield frame 3 and rear portion 4. The top is held releasably in position at the windshield frame 3.

Figure 5:
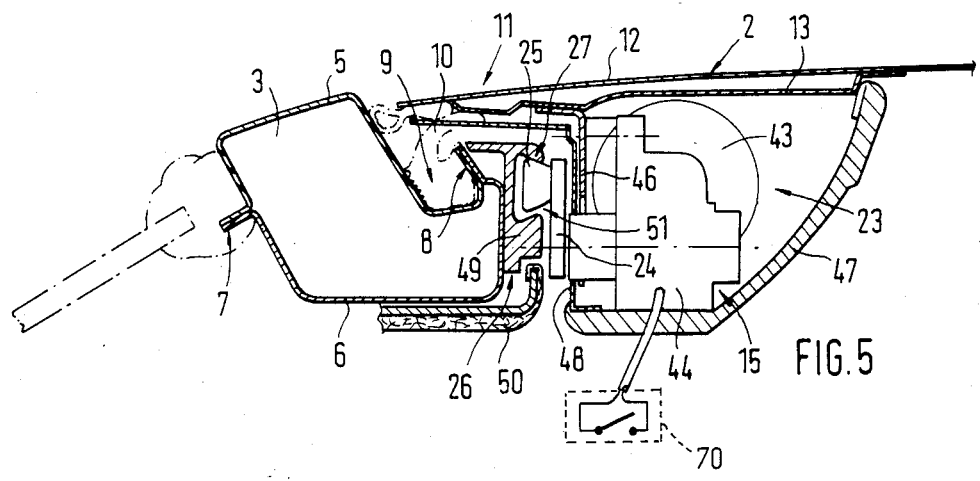
FIG. 5 is an enlarged section along line V—V in FIG. 4.

As can be seen in FIG. 5, the windshield frame 3 is composed of two profiled parts 5 and 6 fastened to each other by welding at flanges 7 and 8. The outwardly disposed profiled part 5 has a U-shaped channel 9 filled oy gasket 10. A marginal portion of forward frame section 11 of the top 2 rests on this gasket. The transversely extending forward frame section 11 is composed of stamped sheet-metal parts 12 and 13 which are fastened together by welding, gluing, or the like.

Figure 2:
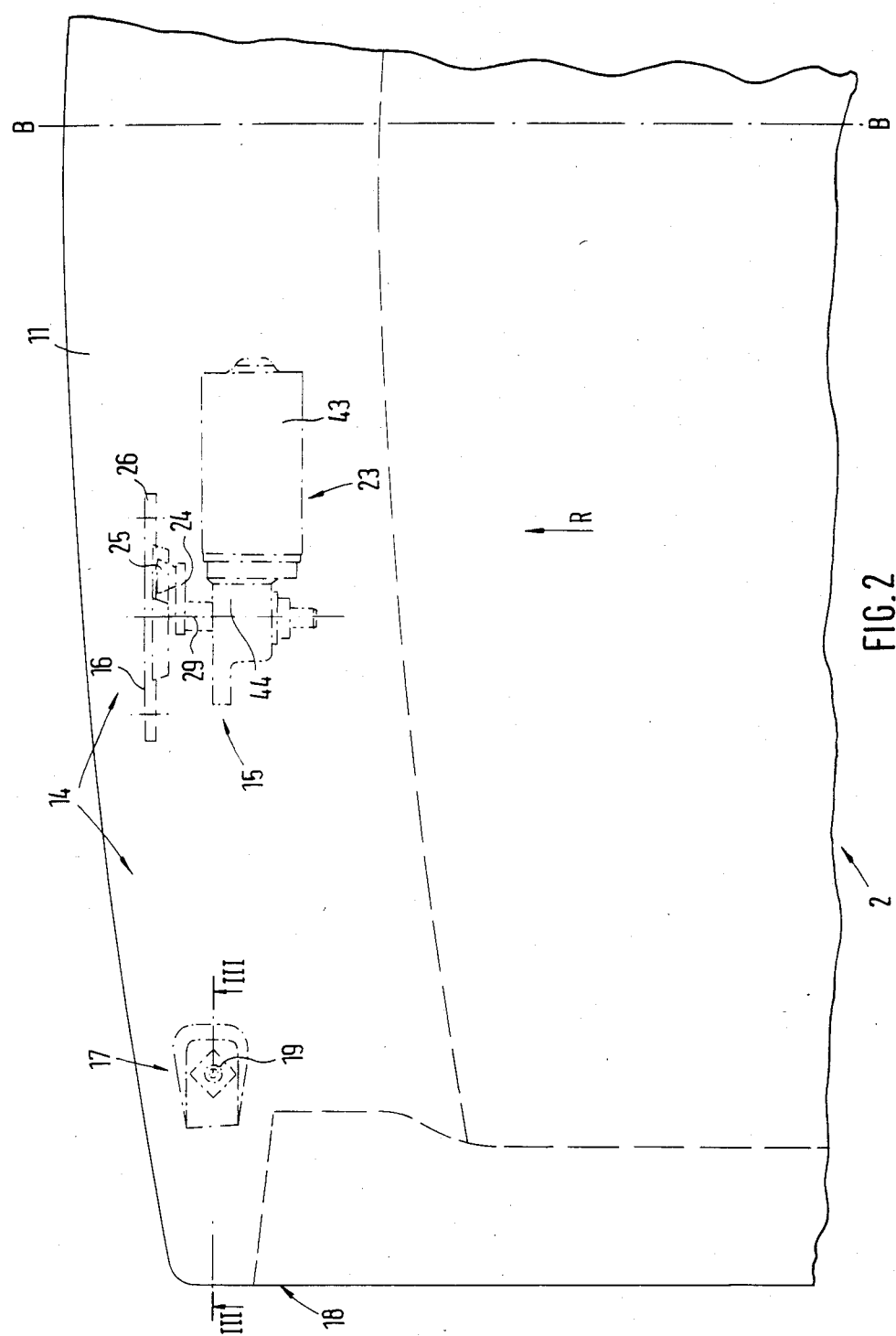
FIG. 2 is a top view of the forward zone of the convertible top.

In order to lock the collapsible top 2 to the windshield frame 3, one locking device 14 is provide on each side of a longitudinal plane of symmetry B—B indicated in FIG. 2. FIGS. 2, 4, 6, 7, 8 and 9 show the side of the locking device 14 which is on the left as seen from the driver's perspective. Each locking device 14 comprises locking member 15 arranged at the forward frame section 11 of the collapsible top 2, mounting 16 provided at the windshield frame 3, and centering means 17 engaging the collapsible top 2 and the windshield frame 3 (FIGS. 2 and 5).

Figure 3:
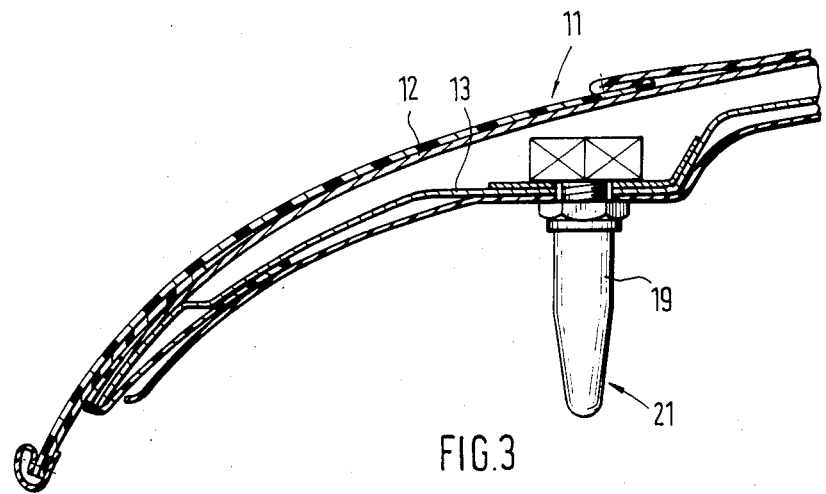
FIG. 3 is an enlarged section along line III—III of FIG. 2.
Figure 4:
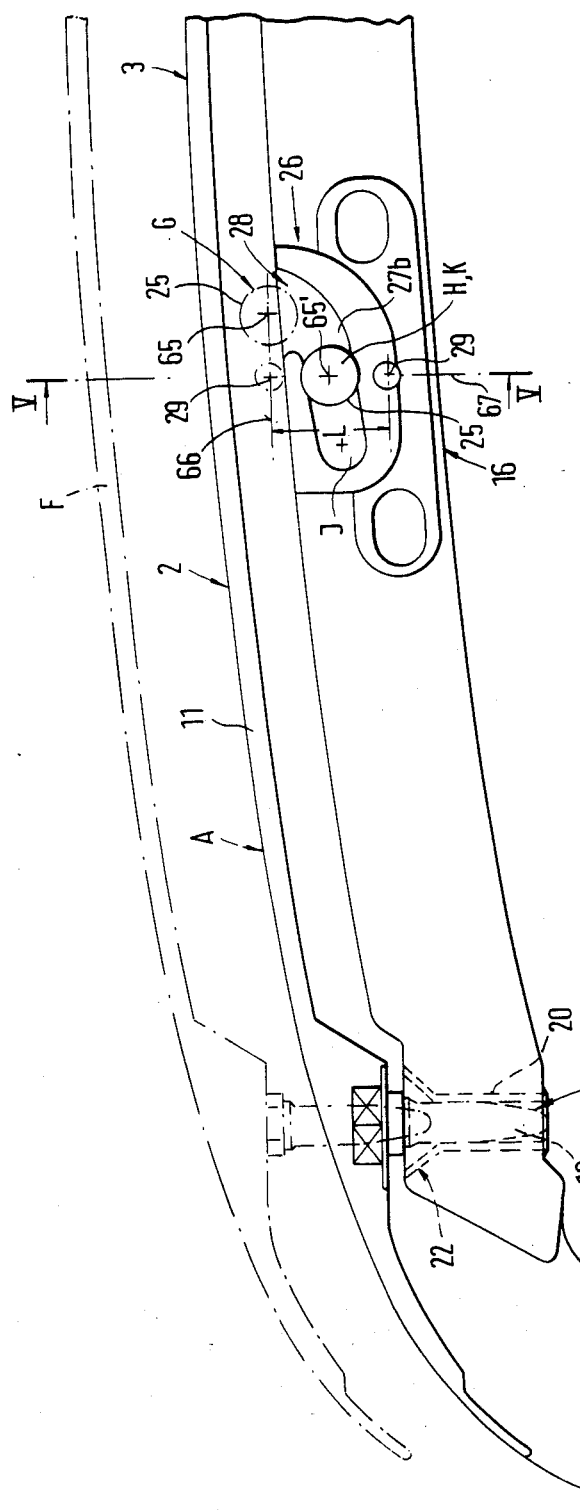
FIG. 4 is front view in the direction of arrow R in FIG. 2.

The centering means 17, respectively disposed in the vicinity of the outwardly located longitudinal sides 18 of the collapsible top 2 are shown in FIGS. 2-4. These centering means each comprise a vertically extending pin 19 mounted at the forward frame section 11. This pin cooperates in a complementary fashion with sleeve 20 mounted in the windshield frame 3 arranged therebelow. The sleeve 20 is formed from an abrasion-proof synthetic resin, e.g., VULKOLLAN, and the pin 19 consists of a metallic material.

As can be seen in FIG. 4, the pin 19 exhibits a conical configuration at its free end 21, whereas upper section 22 of the sleeve 20 is provided with a flaring portion having the shape of a truncated cone. The collapsible top 2 is secured in its longitudinal and transverse positions relative to the vehicle by means of the centering unit 17 before the locking member 15 engages the mounting 16.

As shown in FIG. 5, the locking member 15 has a crank 24 connected to an operating unit 23 and equipped with a locking pin 25. The locking pin 25 cooperates with a slotted guide means 26 constituting the mounting 16, in such a way that movement of the locking pin 25 within guide track 27 of the slotted guide means 26 effects a perpendicular reciprocating motion of the frame portion 11 of the collapsible top 2.

The guide track 27 of the slotted guide means 26 extends in the transverse vehicle direction C—C (indicated in FIG. 4) and is equipped with an access opening 28 for the locking pin 25. This access opening is disposed, as shown in FIG. 4, at an end of the guide track 27 that lies on the inside, i.e. toward plane B (FIG. 2), as seen in the transverse direction in the upper region of the guide track. The locking pin 25 is introduced from above into the guide track 27 in a manner not shown, but readily apparent.

The rotatable shaft 29 of the crank 24 is oriented approximately horizontally and extends in parallel to the central longitudinal plane B—B.

Figure 8:
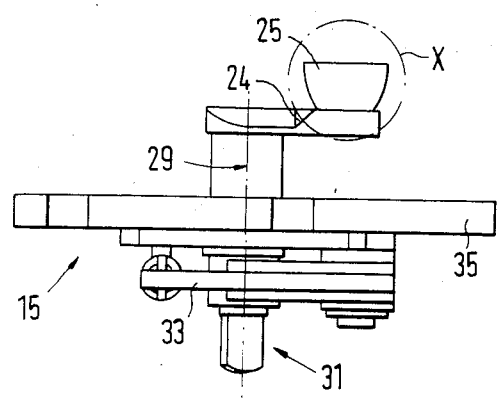
FIG. 8 is a top view of a manually operable locking member in accordance with the present invention.
Figure 9:
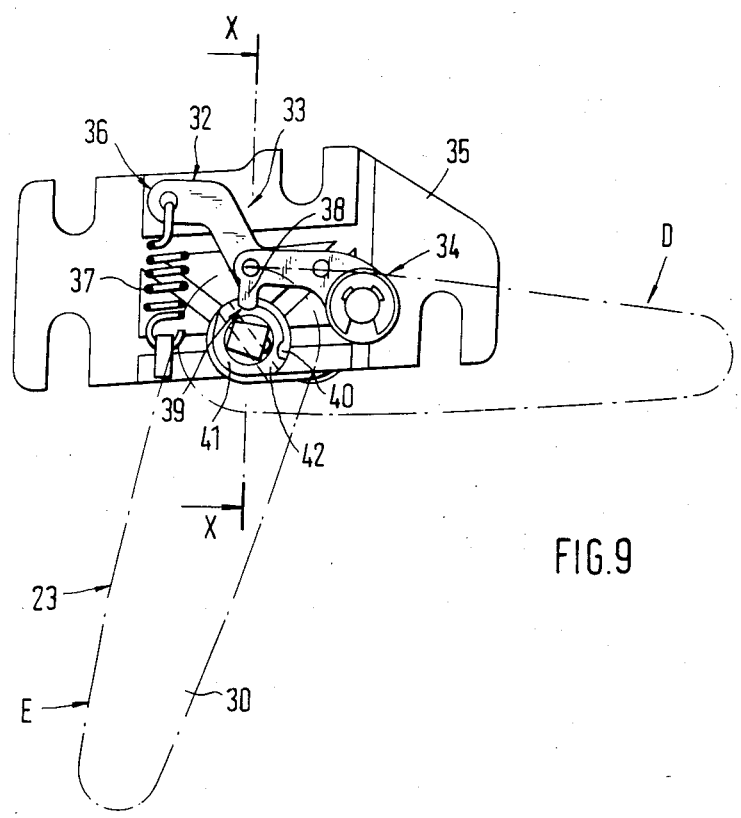
FIG. 9 is a front view of the locking member shown in FIG. 8.
Figure 10:
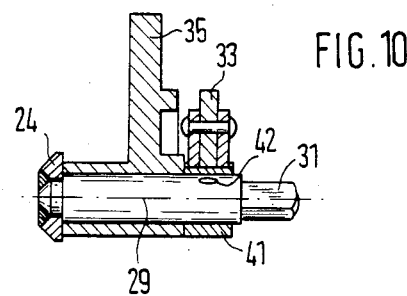
FIG. 10 is a section along line X—X in FIG. 9.

According to FIGS. 8 and 9, the operating unit 23 for the crank 24 is formed by a handle 30 detachably mountable on a square member 31 provided at the end of shaft 29. In this manually operable locking member 15 detent means 32 is provided cooperating with the revolving shaft 29 of the crank 24 in such a way that the revolving axle 29 is fixed in place in the two end positions of the locking pin 25 (locked - unlocked).

The detent means 32 comprises a bent angle lever 33, one end 34 of which is rotatably articulated to a base plate 35 of the locking member 15. The other end 36 of the lever is connected to the base plate 35 with the intermediation of a tension spring 37. The base plate 35 is held in position at the forward frame section 11 with the aid of releasable mounting elements so that it is adjustable.

A downwardly oriented stem 38 is provided in a central portion of the angle lever 33. This stem engages selectively into one of two stop notches 39, 40 of sleeve 41 attached to the rotatable shaft 29. The sleeve 41 is positively joined to the rotatable shaft 29 by means of a pin connection 42. In the manually operable embodiment of locking member 15, a pivoting angle of about 80 degrees to 110 degrees is chosen for reasons of comfort. In the illustrated embodiment, the pivoting angle is 105 degrees. When the convertible top 2 is locked in place, the handle 30 extends approximately horizontally (position D) and is in alignment with the transversely extending frame section 11. When the convertible top 2 is unlocked, the handle 30 assumes an approximately vertical position E (FIG. 9). In order to lock the convertible top 2 in place, the handle 30 is pivoted in the counterclockwise direction.

Figure 12:
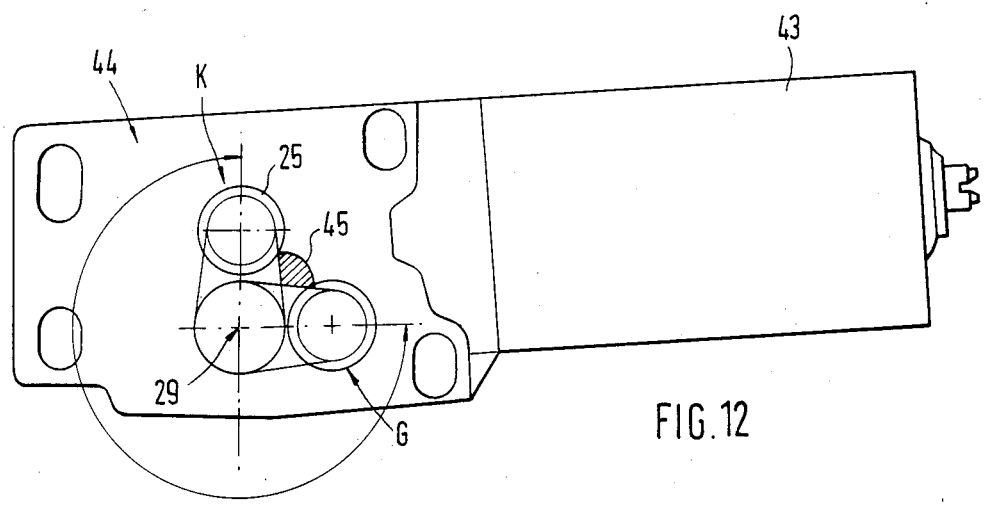
FIG. 12 is a view of an electric motor and of the gear system in the direction of arrow R in FIG. 2 in accordance with the present invention.

According to the embodiment shown in FIGS. 2 and 5, the operating unit 23 comprises an electric motor 43 including a unit with a gear mechanism 44. This unit can be actuated from the interior of the vehicle by switch means 70 shown in FIG. 5. The electric motor 43 is arranged transversely to the longitudinal direction of the vehicle. The gear system 44, which cooperates with the rotatable shaft 29 of the crank 24, is a miter gear mechanism. If the crank 24 is driven by an electric motor, a mechanical step 45 is provided at the gearbox, thereby limiting the rotatable motion of the crank 24 (FIG. 12). During locking of the collapsible top 2, the crank 24 rotates in the clockwise direction by about 270 degrees. The electric motor 43 is held in position at a mounting plate 46 of the forward frame section 11 with the intermediation of mounting screws as shown in FIG. 5.

For reasons of safety and design, a cover 47 is employed for covering the manually operable as well as the motor-operable locking member 15. The cover 47 extends between a lower end of molding 48 of the collapsible top 2 at the end face, and a rear end of the stamped sheet-metal part 13 (FIG. 5).

The slotted guide means 26 is formed by a separate fitting element 49 made of metal or a synthetic resin. This element is held in position on a vertically extending wall of the windshield frame 3, with the intermediation of releasable mounting elements, such as screws (FIG. 5), and faces the passenger compartment. In order to allow for installation and manufacturing tolerances, the slotted guide means 26 is attached to the windshield frame 3 so that it is adjustable in the transverse and vertical directions.

With the exception of the guide track 27, and the access opening 28, the slotted guide means 26 and the windshield frame 3 are covered by a cushioned molding 50 as can be seen in FIG. 5.

According to FIG. 5, the locking pin 25 and the guide track 27 cooperate in complementary fashion in the manner of a dovetail joint. Alternatively, the guide track may also be designed as a C-shape or the like, instead of as a dovetail shape.

Figure 11:
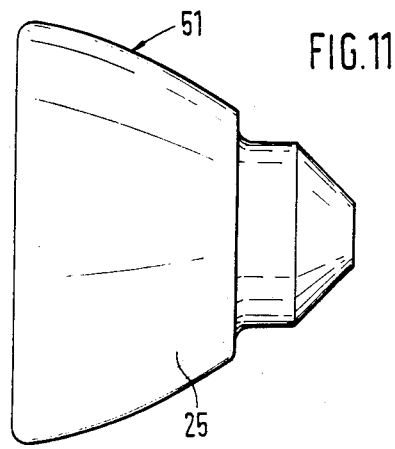
FIG. 11 shows enlarged detail X of FIG. 8.

In order to keep the frictional forces between the guide track 27 and the locking pin 25 at a minimum, the jacket surface 51 of the truncated-cone-shaped locking pin 25 has a rounded configuration so that there is merely a spotwise contact between the guide track 27 and the locking pin 25 (FIG. 11).

The motor-driven crank 24 executes a revolving movement of about 270 degrees during the locking and/or unlocking operations. The manually operated crank 24 executes a swinging motion of about 105 degrees. Accordingly, the slotted guide means 26, which are identical in their external dimensions, are equipped with differently shaped guide tracks 27a and 27b for each type of operating unit. The guide track 27a is employed with the manually operated crank 24 and the guide track 27b is employed with the motor-driven crank 24.

Figure 6:
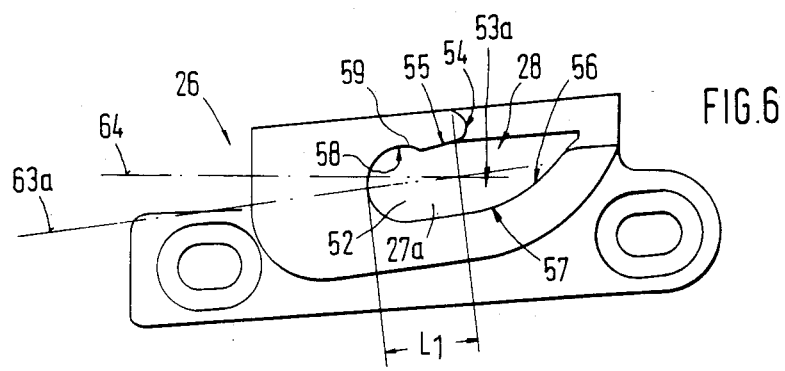
FIG. 6 is a front view of a slotted guide means for a manually operated locking device viewed from inside the vehicle.
Figure 7:
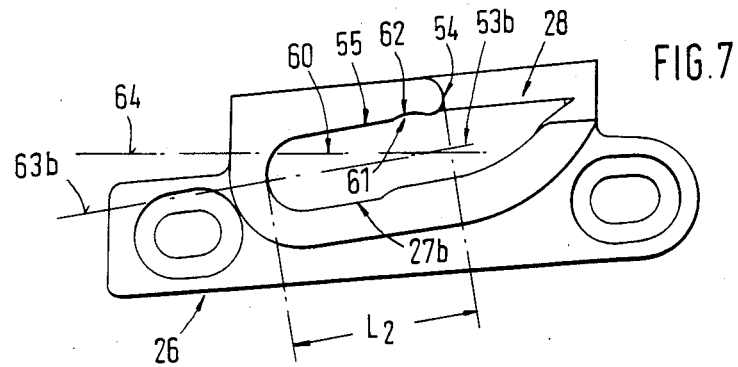
FIG. 7 is a front view of a slotted guide means for a locking device operated by a motor viewed from inside the vehicle.

According to FIG. 6, the guide track 27a is composed of a transversely extending longitudinal slot 52 having a length $L_1$ and an entrance zone 53a, broadening toward the access opening 28. The entrance zone 53a is defined by a rounded end section 54 of upper track segment 55 and a curved region 56 of a lower track segment 57. A catch 58 is provided for the locking position of the locking pin 25 at the outwardly positioned end of the longitudinal slot 52. The catch 58 comprises a curved segment 59 of the longitudinal slot 52 and the upwardly slanting upper track section 55.

The guide track 27b comprises a transversely extending longitudinal slot 60 having a length $L_2$, wherein the length $L_2$ is substantially longer than the length $L_1$. Toward the access opening 28, the longitudinal slot 60 is followed by a flaring entrance zone 53b corresponding in its shape to the entrance zone 53a. The access openings 28 for both guide tracks 27a and 27b likewise exhibit the same shape.

A catch 61 is provided for the locking pin 25 in the proximity of the rounded end segment 54 in the guide track 27b at the upper track section 55. This catch is formed by an outwardly curved recess 62 of the upper track seciton 55.

The two longitudinal slots 52 and 60 are designed, as seen in cross section, so that a slight movement of the locking pin 25 can take place in the vertical direction. Disengagement of the locking pin 25 in the longitudinal direction, however, is impossible due to the difference between the diameter of locking pin 25 and the opening guide track 27a or 27b.

The center lines 63a and 63b of the longitudinal slots 52, 60 are inclined with respect to a horizontal auxiliary plane 64, in such a way that the center lines 63a and 63b slant downwardly toward the outside of the vehicle.

The locking device 14 operates as follows: The opened convertible top 2 is swung forward until the pins 19 partially enter the sleeves 20 as shown in FIG. 4. In this position F, the convertible top 2 is still about 30 mm above the windshield frame 3. Thereupon, in the manual arrangement, the convertible top 2 is pulled downward by means of the two handles 30 (FIG. 9) a small distance toward the gasket 10. The locking pins 25 then engage the guide tracks 27a. By turning both handles 30 by about 105 degrees, the locking pin 25 cooperates with the guide track 27a, and additional tensioning of the convertible top 2 is effected with respect to the windshield frame 3. Simultaneously, fixation of the top is effected, once the locking pins 25 engage catch 58.

With the motor-driven crank 24, manual tensioning of the convertible top 2 is unnecessary. As soon as the convertible top 2 is positioned about 30 mm above the windshield frame 3 (position F in FIG. 4), both electric motors 43 are activated by switching cams, not shown, arranged between the convertible top 2 and the windshield frame 3.

At the beginning of the locking process, the revolving axis 29 of the crank 24 and the axis 65 of the locking pin 25 lie on an approximately horizontal line 66 with the locking pin 25 projecting partially into the guide track 27b (see FIG. 4). The axis 65 of the locking pin 25 is closer to the central longitudinal plane B—B than the more outwardly located rotatable shaft 29.

Due to the revolving motion of the crank 24 by 270 degrees, the locking pin 25 moves via the positions G (0 degrees), H (90 degrees), J (180 degrees) and K (270 degrees) along the guide track 27b, whereas the shaft 29 of the crank 24 executes a vertical lowering movement by the dimension L (FIG. 4). With the convertible top locked in place (position K), the locking pin 25 engages the catch 61 of the upper track section 55, and the axis of rotation 29 of crank 24 lies on the vertical line 67, i.e. below the axis 65' of the locking pin 25. In positions H and K, the locking pin 25 assumes the same position within the guide track 27b.

In addition, it is further contemplated that the locking device 14 of this invention be utilized in an arrangement wherein a removable top is arranged between a windshield frame and a roll bar.

The advantages primarily attained by this invention are that a locking device for a top has been created with simple, economically producible means which exhibit satisfactory functioning, occupy a small amount of space (compact, flat construction), and moreover achieve a considerable improvement in operating convenience. The locking device, on account of its structure, is suitable for manual as well as electric-motor operation. Since the essential components of the locking device are arranged in a covered fashion at the windshield frame and at the forward frame section of the top, respectively, the risk of injury to the occupants is diminished. Due to the configuration of the guide track for the slotted guide means, the top is automatically tensioned in the downward direction, for which purpose only a slight operating force is needed.

From the preceding description of the preferred embodiments, it is evident that the objects of the invention are attained, and although the invention has been described and illustrated in detail, it is to be clearly understood that the same is by way of illustration and example only, and is not to be taken by way of limitation. The spirit and scope of the invention are to be limited only by the terms of the appended claims.

What is claimed is:

1. A locking device for a vehicle top having a forward frame section exhibiting locking means reversibly engagable with mounting means provided at a front windshield frame, said locking means comprising crank means, locking pin means attached to said crank means, and operating unit means for moving said crank means, and said mounting means comprising slotted guide means exhibiting a guide track slot for receiving said locking pin means, wherein rotation of said crank means from an unlocked to a locked position causes said locking pin means to enter and interact within said guide track slot to pull said vehicle top in a vertically downward direction, and wherein rotation of said crank means from said locked to said unlocked position causes said locking pin means to interact within said guide track slot to push said vehicle top in a vertically upward direction and to subsequently disengage from said guide track slot.

2. A locking device according to claim 1, further comprising centering means for centering said vehicle top with said vehicle windshield frame.

3. A locking device according to claim 1, wherein said guide track slot extends in a transverse direction relative to a longitudinal axis of a vehicle exhibiting said locking device, said guide track slot having an access opening, said locking pin means being reversibly engageable with said guide track slot by way of said access opening.

4. A locking device according to claim 3, wherein said guide track slot has an upper track section and a lower track section adjacent said access opening and a transversely extending longitudinal slot adjacent said upper track section and said lower track section, said upper track section exhibiting a rounded end section, said lower track section exhibiting a curved slope.

5. A locking device according to claim 4, wherein said transversely extending longitudinal slot slants downwardly away from a center line of said vehicle.

6. A locking device according to claim 5, wherein catch means are provided in said upper track section for locking said locking pin means in said guide track slot.

7. A locking device according to claim 1, wherein said locking pin means has a first cross-sectional configuration and said guide track means has a second cross-sectional configuration, said cross-sectional configurations precluding disengagement of said locking pin means and said guide track means in a longitudinal direction relative to said vehicle.

8. A locking device according to claim 7, wherein said locking pin means has a dovetail sectional configuration.

9. A locking device according to claim 1, wherein said windshield frame has a vertically extending wall, and said slotted guide means includes fitting element means for receiving said locking pin means, and wherein said vertically extending wall is capable of holding said fitting element means in a position for receiving said locking pin means.

10. A locking device according to claim 9, wherein said slotted guide means is adjustably mounted to said windshield frame.

11. A locking device according to claim 1, wherein at least a portion of said slotted guide means is covered by cushioned molding means.

12. A locking device according to claim 1, wherein said locking pin means comprises a truncated cone.

13. A locking device according to claim 1, wherein said operating unit means comprises rotatable shaft means supporting said crank means, and handle means attached to one end of said shaft means for rotating said locking pin means into locked and unlocked positions.

14. A locking device according to claim 13, wherein rotation of said locking pin means between said locked and unlocked positions requires rotation of said shaft means between 80 degrees and 110 degrees.

15. A locking device according to claim 1, wherein said operating unit comprises electric motor means said electric motor means having switch means for actuating said motor, said switch means capable of being activated from a passenger compartment of said vehicle.

16. A locking device according to claim 15, wherein said electric motor means is oriented transversely to a longitudinal axis of said vehicle.

17. A locking device according to claim 16, wherein said electric motor means includes gear means.

18. A locking device according to claim 17, wherein said gear means includes mechanical stop means for limiting rotational movement of said crank means.

19. A locking device according to claim 13, further comprises detent means engageable with said shaft means for preventing rotation of said shaft means when said shaft means is in said unlocked and locked positions.

20. A locking device according to claim 19, wherein said detent means comprises spring-biased lever means selectively engageable with stop notch means on said shaft means.

21. A locking device according to claim 1, further comprising cover means for covering said locking means.

22. A locking device according to claim 2, wherein said centering means comprises vertically extending pin means arranged at a forward frame section of said top, and sleeve means arranged in said windshield frame, said vertically extending pin means being engageable with said sleeve means.

23. A locking device according to claim 22, wherein said pin means has an end portion having a conical configuration, and an upper portion of said sleeve means has a flared portion, said end of said pin means engageable in said flared portion of said sleeve means.

* * * * *